United States Patent
Charette

(10) Patent No.: US 7,637,168 B2
(45) Date of Patent: Dec. 29, 2009

(54) SEEPAGE METER FOR MEASURING SUBMARINE GROUNDWATER DISCHARGE

(75) Inventor: Matthew Charette, East Falmouth, MA (US)

(73) Assignee: Woods Hole Oceanographic Institution, Woods Hole, MA (US)

( * ) Notice: Subject to any disclaimer, the term of this patent is extended or adjusted under 35 U.S.C. 154(b) by 0 days.

(21) Appl. No.: 11/900,505

(22) Filed: Sep. 11, 2007

(65) Prior Publication Data

US 2008/0196509 A1 Aug. 21, 2008

Related U.S. Application Data

(60) Provisional application No. 60/843,620, filed on Sep. 11, 2006.

(51) Int. Cl.
*G01F 1/708* (2006.01)
*G01F 1/00* (2006.01)

(52) U.S. Cl. .................. 73/861.05; 73/861

(58) Field of Classification Search ............ None
See application file for complete search history.

(56) References Cited

U.S. PATENT DOCUMENTS

| | | | | |
|---|---|---|---|---|
| 5,497,663 | A * | 3/1996 | Reay et al. ............... | 73/861 |
| 5,594,179 | A * | 1/1997 | Marsh ..................... | 73/861.07 |
| 6,276,217 | B1 * | 8/2001 | Hirano et al. ............ | 73/861.05 |
| 6,874,371 | B1 * | 4/2005 | Smith et al. .............. | 73/861.23 |
| 6,938,495 | B2 * | 9/2005 | Hirano et al. ............ | 73/861.05 |
| 7,107,859 | B2 * | 9/2006 | Smith et al. .............. | 73/861.23 |

FOREIGN PATENT DOCUMENTS

JP 62025239 2/1987

OTHER PUBLICATIONS

Bokuniewicz et al., "Direct measurements of submarine groundwater discharge (SGD) over a fractured rock aquifer in Flamengo Bay Brazil," Estuarine Coastal and Shelf Science, 76(3):466-472 (2007).
Sholkovitz et al., "An automated dye-dilution based seepage meter for the time-series measurement of submarine groundwater discharge," Limnology and Oceanography: Methods, 1:16-28 (2003).
Tryon et al., "A new benthic aqueous flux meter for very low to moderate discharge rates," Deep-Sea Research Part I, 48:2121-2146 (2001).
International Search Report for PCT/US2008/010617 dated May 8, 2009.

* cited by examiner

*Primary Examiner*—Harshad Patel
(74) *Attorney, Agent, or Firm*—Ropes & Gray LLP

(57) ABSTRACT

Automated seepage meters that can detect and quantify groundwater outflow and seawater infiltration. In addition to its capabilities in saltwater-influenced systems, the automated seepage meter can detect and quantify groundwater outflow and surface water infiltration in freshwater systems (e.g., aquatic, riverine, lacustrine environments). Based on a dye-dilution technique, this instrument provides high resolution time series data for submarine groundwater discharge to the coastal zone. The dye dilution method may employ two repeatable steps: the timed injection of a water-soluble dye into a dye mixing chamber mounted in series with a seepage or collection chamber and the subsequent timed measurements of the absorbance of the dyed solution.

17 Claims, 3 Drawing Sheets

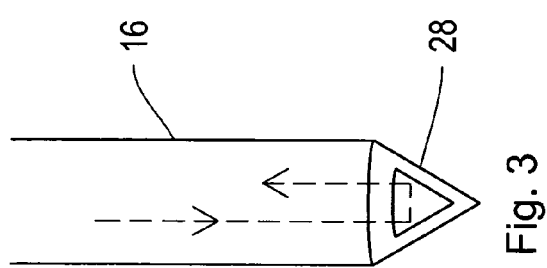
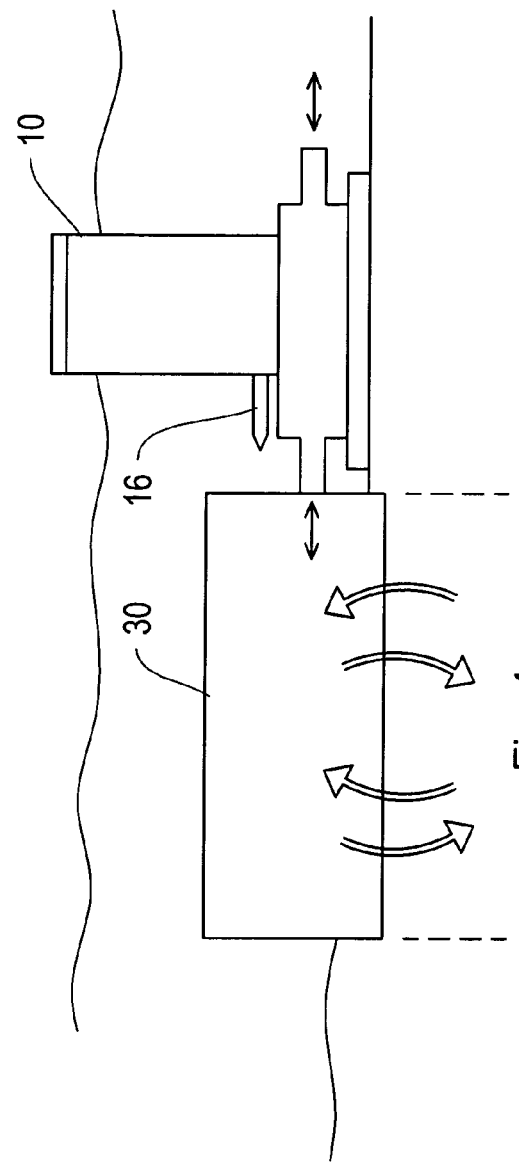

SEEPAGE METER FOR MEASURING SUBMARINE GROUNDWATER DISCHARGE

This application claims the benefit of U.S. Provisional Application Ser. No. 60/843,620, filed Sep. 11, 2006, the entire contents of which are incorporated herein by reference.

BACKGROUND

Submarine groundwater discharge (SGD) is a noted potential mechanism for delivery of certain chemical species to the ocean. SGD involves the upward flow of water into the ocean from the sediments. SGD can bring water and chemicals into salt marshes, coastal waters, bays, coral reefs and other areas. The effect of SGD derived nutrients and pollutants to coastal waters can lead to environmental problems, including eutrophication and the deterioration of the natural ecology. Accordingly, the study of the flow and in particular the volume of the flow of submarine groundwater discharge in saltwater bays is of interest to scientists studying the environment of an estuary or other habitat.

Techniques for measuring groundwater seepage rates are known, and the predominant technique is to employ a drum as a seepage housing and fit the housing with a plastic bag and then secure the housing to the ocean floor. Numerous articles discuss that the volumetric measurement of a seepage rate using a bag on the end of a seepage housing and note that this technique is prone to artifacts (Shaw and Prepas 1989; Belanger and Montgomery 1992; Isiorho and Meyer 1999; Shinn et al. 2002). Specifically, bag-derived flow rates may be biased by constriction of flow by the bag and/or by wave-induced motion of the water inside the bag. Bags, partially prefilled with water prior to deployment, yielded more accurate results than empty bags (Belanger and Montgomery 1992). Moreover, the intensive labor involved in the bag method does not lend itself to time series studies on the scale of lunar tidal cycles and seasons. Perhaps most importantly, the validity of reverse flow measurements using bags has not been adequately proven. For the reasons mentioned above, the development of automated seepage meters have been carried out by several groups, and some of these techniques are discussed in An automated Dye-dilution Based Seepage Meter for the Time-series Measurement of Submarine Groundwater Discharge, Edward Sholkovitz, Craig Herbold, and Matthew Charette Limnol. Oceanogr.: Methods 1, 2003, 16-28 (2003). Several articles are noted therein including one that discusses a heat-pulse based instrument developed by Taniguchi and Fukuo (1993) and Taniguchi and Iwakawa (2001). The timed transmission of heat pulses to downstream thermistors in a flow tube forms the basis of this method. Another seepage meter discussed therein also employs heat-pulse technology (Krupa et al. 1998). Paulsen et al. (2001) have developed an acoustic (ultrasonic) automated seepage meter, based on the timed perturbation of sound in a moving fluid. The paper itself discusses a timed dilution of dye as the basis for calculating the flow. All three instruments use seepage housings to collect and focus the flow through a tube or small chamber. All three instruments employ an "open-system" design that allows unrestricted fluid flow in either direction.

Although the above systems can work well, there exists a need for improved and more accurate flow meter systems that can work in an underwater environment.

SUMMARY

The systems and methods described herein include an automated seepage meter that can detect and quantify groundwater outflow and seawater infiltration. In addition to its capabilities in saltwater-influenced systems, the automated seepage meter can detect and quantify groundwater outflow and surface water infiltration in freshwater systems (e.g., aquatic, riverine, lacustrine environments). Based on a dye-dilution technique, this instrument provides high resolution time series data for submarine groundwater discharge to the coastal zone. The dye dilution method involves two repeatable steps: (1) the timed injection of a water-soluble dye into a dye mixing chamber mounted in series with a seepage chamber and (2) the subsequent timed measurements of the absorbance of the dyed solution. The rate at which the dyed solution is diluted by the inflow or outflow of water is directly proportional to the flow rate of groundwater moving through the surface area of the seepage housing. In the embodiments described herein a fiber optic absorbance meter is placed within a mixing chamber into which groundwater is flowed. Injected into the flowing groundwater is a water soluble dye that will color the flowing groundwater. The fiber optic absorbance meter measures the relative proportion of dye within the mixing chamber and, through a series of timed measurements, measures the rate at which the dye is diluted within the mixing chamber. This, therefore measures the rate at which groundwater passes through the mixing chamber.

More particularly, in one embodiment, the systems and methods described herein include, among other things, seepage meters for measuring a flow of ground water. In certain embodiments, these systems include a collar for fastening to a section of ground and forming a fluid tight seal around the section of ground, a mixing chamber coupled to the collar and having an inlet and an outlet for allowing fluid to pass from the collar through the mixing chamber, a dye injector for making timed injections of a water soluble dye into the mixing chamber, and an optical absorbance meter located within the mixing chamber and having a light source for passing a beam of light through the fluid flowing through the mixing chamber and a light receiver for measuring a characteristic representative of absorbance of a wavelength of light. The meters may also have a processor for processing the measured characteristic to determine a rate of flow for fluid passing through the section of ground. The dye may be water soluble so that the processor determining the rate of flow may employ an assumption that dilution is the only process acting to change the dye concentration in the mixing chamber.

The seepage meter systems may have various additional features and modifications and such may include a collection chamber coupled to the collar for collecting fluid passing through the section of ground, as well as a pump for mixing the dye and fluid in the mixing chamber.

Optionally, the absorbance meter includes a plurality of light sources disposed at different respective locations within the mixing chamber. This allows the meter to take multiple measurements at the same time and use averaged measures, or to compare measures taken at different locations or to otherwise use multiple measures of the characteristic to determine the rate of flow.

The seepage meter may also include a timer for making a series of timed measurements and/or for making timed dye injections and optionally for determining a rate of flow of groundwater through the section of ground.

Optionally, the seepage meter may include a background sensor for measuring a characteristic representative of absorbance of a wavelength of light of fluid in the mixing chamber and absent the injected dye. For example, the meter may include a sensor for measuring the absorbance characteristic of seawater that is outside of the mixing chamber or that is in a separate chamber that contains seepage groundwater that has not been dyed. Additionally and optionally, the seepage meter may include a sensor to measure direction of groundwater flow. Thus for example the sensor can tell whether the flow is out of or into the section of ground. Typically, the seepage meter will have a water tight housing around device, a battery, solar or other local power supply, and other features for keeping the meter active and operational while submerged. Communication devices, such as radio links, network cards or optical or acoustic modems may also be provided to communicate data to a remote location.

Typically, the seepage will use a dye that is absorbed at a wavelength that seldom appears in nature. In one example, the absorbance meter measures absorbance of at least two wavelengths of light and preferably one of the wavelengths is in the about 590 nm. Optionally, the meter may also use multiple wavelengths of light to determine the rate of groundwater flow or seepage.

In alternate embodiments the seepage meter may also include a chemical sensor for detecting a chemical element flowing through the mixing chamber and for determining rate of flow of the chemical .through the section of ground.

In another aspect, the invention provides processes, including a process for measuring a flow of ground water. Such processes may include fastening a collar to a section of ground and forming a fluid tight seal around the section of ground, and coupling a mixing chamber to the collar such that ground water passing through the section of ground will pass through the mixing chamber. In another step, the process injects dye into the fluid within the mixing chamber, and passes a beam of light through the fluid flowing through the mixing chamber. The process measures light passing through the fluid to record a characteristic representative of absorbance of a wavelength of light. The process uses the measured characteristic to determine a rate of flow for fluid passing through the section of ground.

Optionally, the process provides a plurality of light sources at different respective locations within the mixing chamber for taking plural measures of absorbance and may make a series of timed measurements and dye injections for determining a rate of flow of groundwater through the section of ground. Further optionally, the process measures background absorbance levels of undyed or untreated fluid and may also measure the direction of groundwater flow.

DESCRIPTION OF THE FIGURES

The foregoing and other objects and advantages of the invention will be appreciated more fully from the following further description thereof, with reference to the accompanying drawings wherein;

FIG. 3 depicts in more detail a reflective absorbance meter of the type suitable for use with the mixing chamber depicted in FIG. 2.

FIG. 4 depicts a seepage meter system and groundwater collection device.

DESCRIPTION OF CERTAIN ILLUSTRATED EMBODIMENTS

To provide an overall understanding of the invention, certain illustrative embodiments will now be described, including a system that disposes an absorbance meter, and in particular an optical absorbance meter, into a mixing chamber to identify and measure the changing absorbance characteristic of a fluid flowing through the mixing chamber as a dye placed into the chamber is diluted over time by the flowing fluid. However, it will be understood by one of ordinary skill in the art that the systems and methods described herein can be adapted and modified for other suitable applications and that such other additions and modifications will not depart from the scope hereof.

Figure 1A:
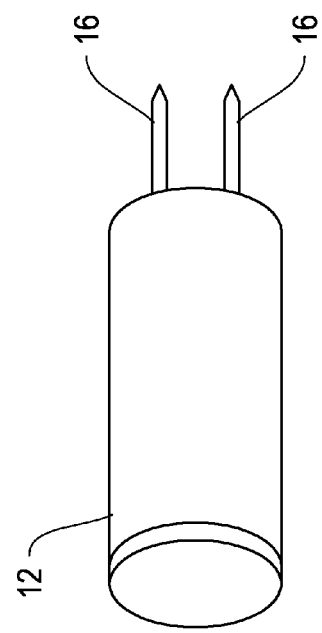
FIGS. 1A and 1B depict one embodiment of the invention.
Figure 1B:
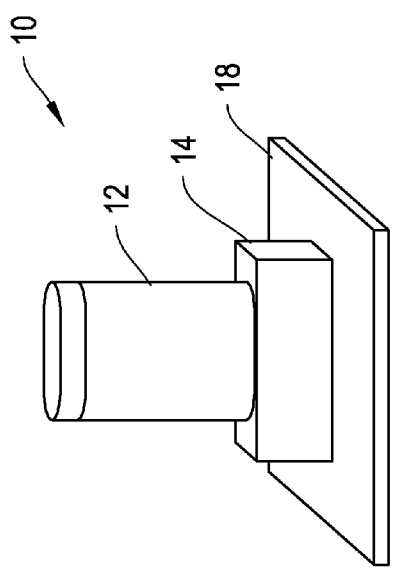

FIGS. 1A and 1B depict a first embodiment of the systems described herein. In particular 1A depicts an absorbance meter of the type described herein and FIG. 1B depicts a seepage meter using the absorbance meter depicted in FIG. 1A. In particular, FIG. 1B depicts a seepage meter 10 that includes an absorbance meter 12 positioned above a mixing chamber 14. The depicted absorbance meter 12 includes two sensor probes 16 that may pass into the mixing chamber 14 to measure characteristics that are representative of the rate of flow of fluid through the chamber 14. In the depicted embodiment, the absorbance meter 12 is depicted as being on top of the mixing chamber 14 thereby having the sensor probes 16 enter into the mixing chamber 14 from the top. However, other embodiments and configurations may be employed and optionally, the fiber optic probes may enter the mixing chamber 14 from the side, to thereby avoid putting the weight of the pressure housing of the absorbance meter 12 on the two probes 16 and the mixing chamber 14. The mixing chamber 14 is seated on and connected to a base 18 and the base 18 is capable of being deployed on to the ocean floor in such a way as to maintain the device 10 in a relatively stable state. As shown in FIG. 1A the absorbance meter 12 includes, in this embodiment two stainless steel sensor probe elements 16 that extend outwardly from the housing of the absorbance meter 12. Additional optional elements, including battery power supplies, telemetry equipment, thermostats, water samplers, pumps for pumping dyes, groundwater and other fluids, and other sensors may also be contained in the housing of the meter 10.

Figure 2:
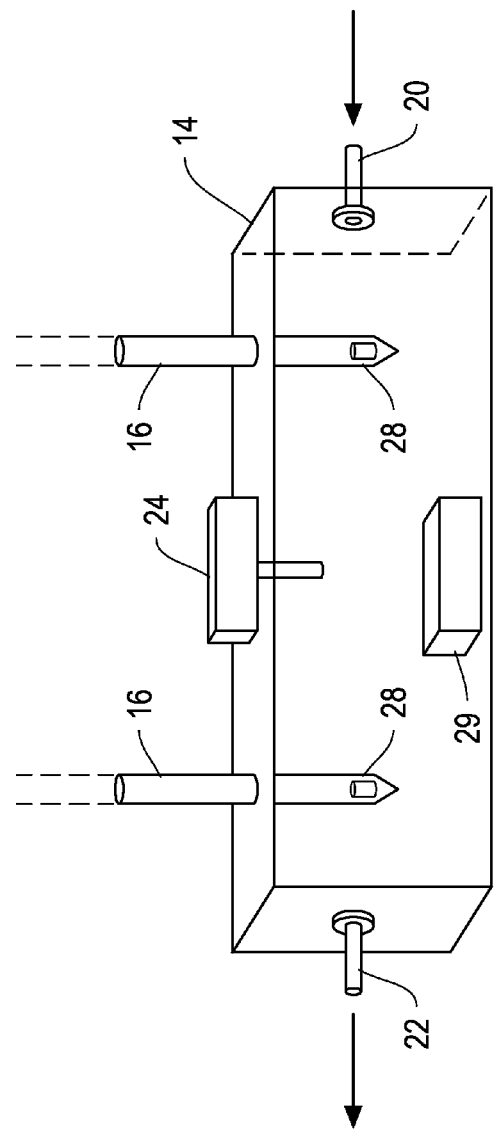
FIG. 2 depicts in more detail a mixing chamber of the type suitable for use in the system shown in FIG. 1B.

In FIG. 2, the sensors probes 16 are shown as being disposed within the mixing chamber 14. In particular, FIG. 2 depicts the mixing chamber 14, the stainless steel probes 16, a dye injector 24, an inlet/outlet port 20, an inlet/outlet port 22, and sensor ports 28 each of which are located at the distal end of the sensors 16. Also depicted in FIG. 2 is a mixing pump 29. The mixing pump 29 is disposed within the mixing chamber 14 and mixes the fluid within the chamber 14. Typically, the mixing pump 29 will mix the fluid in the chamber to keep the injected dye evenly mixed throughout the chamber 14. The mixing pump 29 may be a conventional electrical circulation pump of the type commonly used for circulating fluid in a tank or chamber.

As shown in FIG. 2 the absorbance meter 12 can have two sensor probes 16, although in other embodiments a single sensor may be used. The depicted sensor probes 16 may be disposed at either end of the mixing chamber 14. The port 20 can couple with source of groundwater discharge (e.g. via a seepage or collection housing/funnel) thereby allowing groundwater to flow into the interior of the mixing chamber 14. The port 22 can allow for the groundwater within the mixing chamber 14 to pass out of the mixing chamber 14. The dye injector 24 can inject a water soluble dye into the interior of the mixing chamber of 14 thereby allowing the water soluble dye to mix with and color the groundwater flowing through the interior of the mixing chamber 14. The pump 29 may optionally be coupled at a point that is external to the mixing chamber 14, or located at some other position and it will be understood that any suitable location for the pump 29 may be used as long as the pump is capable of evenly mixing the soluble dye with the fluid in the chamber 14. The pump may mix the dye in the chamber 14 by drawing water from the chamber 14 in one port and pumping it back into the chamber 14 through a second port. The pump 29 will mix the dye so that the dye is substantially evenly distributed throughout the fluid in the sample. This is understood to establish a uniform absorbance characteristic for the volume of fluid in the chamber 14. The pump 29 may optionally be operating continually to keep the dye evenly distributed throughout the chamber. This way changes in the absorbance characteristic may be modeled as representative of dilution of the dyed initial volume of fluid in the chamber by incoming volumes of non-dyed fluid entering the chamber through either of the ports 20 or 22 depending upon the flow of the groundwater. Additionally, the pump 29 may include a mechanism for flushing volumes of fluid from the mixing chamber 14, to eliminate or substantially eliminate the presence of dye or other injected substance within the mixing chamber 14.

The mixing chamber 14 is typically a plastic, such as plexiglass, chamber, that is sealed against the environment and that is optionally sufficiently transparent to allow a user to observe that dye is passing into the chamber 14 and mixing with the groundwater therein. In many cases it will be noted that the seepage meter may be placed at a location that is proximate the upland shore and in water depths that are sufficiently shallow to allow an above sea observer to visually monitor whether a colored dye or other material is present within the mixing chamber 14. The chamber 14 may be of any suitable size, volume and geometry and in one embodiment has an internal volume of about 50 ml to 1000 ml and more typically between 100 ml and 500 ml, however any suitable size may be used and the size selected will typically depend upon the application. One of the fiber optic sensors will extend outside of the chamber at location 22 so it may measure the background absorbance of the groundwater coming into the box. The second fiber optic sensor 16 may extend into the mixing chamber 14. Optionally, two or more sensors 16 may be placed in the chamber 14 or external to the chamber. The background absorbance may be used as a baseline value to help monitor the change in absorbance of groundwater contained in the mixing chamber 14.

FIG. 2 illustrates that the seepage meter disposes an optical absorbance meter within the interior of the mixing chamber 14 so that measurements of the absorbance are made of fluid that is currently in the mixing chamber 14. This reduces the need for pumps that will withdraw the fluid from the chamber 14 to be analyzed in a separate analytical device. By eliminating this pump, the device may be made smaller and will use less power. The reduction in power usage is important as the seepage meter is often placed at a remote location and therefore requires stand alone operation off of a self-contained power supply such as a battery.

FIG. 3 shows in more detail one embodiment of the absorbance meter sensor probe 16. In particular, FIG. 3 shows that the fiber optic absorbance meter sensor probe 16 includes an open port 28. The open port 28 is open to the flow of fluid and allows the groundwater or other fluid in the chamber 14 to pass through the port 28. As shown in FIG. 3 a source of light, typically a light emitting diode of known wavelength or being switchable among multiple known wavelengths, directs a beam of light downward toward the port 28.

In the embodiment shown in FIG. 3 the port 28 includes two mirrored surfaces that oppose each other at 45 degree angles. The light passing through the sensor probe 16 in a downward reflects off the first mirror and is directed to the second mirror. Light from the second mirror is reflected upwardly back into the body of the sensor probe 16, and typically into an optical fiber. In this way a light path is established through the port 28. Accordingly, the amount of light that passes through the port 28 depends, at least in part, on the absorbance of any material that is passing through the port 28. The dyed groundwater will have an initial absorbance characteristic that is in part representative of the concentration of dye within the mixing chamber 14. The water soluble dye may be selected to be particularly interfered with and absorbed by the wavelength of light being reflected between the two mirrors within the port 28, it may also be selected to provide a characteristic absorbance to the dyed groundwater that is different from the characteristic absorbance of groundwater or other typical environmental moieties that naturally occur or may be known to likely occur within the area where the meter is placed. In one embodiment, the light source generates light at a wavelength of about 590 nm and the dye injected into the mixing chamber is selected to be absorbed at or about that wavelength. In one particular embodiment, the light source and absorbance meter were of the type manufactured and sold by Ocean Optics, Inc. of Dunedin, Fla. In any case, the relative concentration of dye within the mixing chamber 14 may be monitored by measuring the amount of light that is absorbed while ground water passes through port 28. A series of time sequenced measurements will establish the rate at which the dye is being diluted by the passage of groundwater through the mixing chamber of 14. Over time the groundwater will carry away the injected dye and sensor 16 will no longer measure a changing absorbance characteristic of the material within the port 28.

FIG. 2 also illustrates the dye injector 24. As shown, the dye injector 24 may be a simple injector that is mechanically coupled to the exterior of the mixing chamber 14 and that has an injection needle that extends into the interior of the mixing chamber 14. The dye injector 24 may include an internal reservoir of concentrated dye and may, in one practice, inject about 1 ml of concentrated dye into the 500 ml chamber 14. The dye injector may be a solenoid operated pump of the type that is commercially available and may optionally include a coupling to a remote reservoir of dye material that can be drawn into the injector 24 and delivered into the chamber 14. The dye injector 24 may also include a timer that optionally runs under the control of a microprocessor or a microcontroller. The timer may generate a periodic timing signal that acts as trigger for the solenoid pump to inject dye into the mixing chamber 14. For example, the dye injector 24 may connect to a microcontroller, such as a PIC controller, that generates a timing signal having a period of for example 30 minutes. At thirty minute intervals the dye injector 24 can deliver a 5 ml dose of water soluble dye into the mixing chamber 14. The pump 29 may be in continuous operation and will mix the dye with the fluid in the chamber 14. The added dye will change the absorbance characteristic of the fluid in the chamber 14. Over the next thirty minutes, before the next injection of dye, the absorbance meter may take a plurality of measures of the absorbance characteristic of the fluid in the chamber 14. It is understood that groundwater seeping into or out of the section of ground being monitored will result in the dilution of the dyed fluid in the mixing chamber 14. This will decrease the absorbance characteristic of the fluid in the chamber 14 and the rate of dilution will be representative of the rate of flow of fluid into the mixing chamber 14.

In certain optional embodiments, the processor or controller may be programmed to change the timing of the dye injections based on the rate at which the dye is being diluted from the mixing chamber. Thus if measurements of the rate at which dye is being flushed from the mixing chamber indicates that the mixing chamber 14 is devoid of dye after ten minutes, the controller can reduce the length of the period for injecting dye, to for example a period of once every fifteen minutes. Alternatively, if the rate of dye being flushed from the system is very slow, the period may be extended. The controller will record the delivery time of the dye injections and record the measure absorbance levels and determine the rate of seepage. A real time clock may be added so that the seepage rate date is correlated to the time of day, and thus to specific times and tidal conditions.

It will be noted that the device 10 may also be used to detect the direction of water flow. For example, in one process the sensor probe 16 may be located between the mixing chamber 14 and the funnel, or at some other suitable location. The sensor 16 may be used to measure the absorbance characteristic of water pumped from the funnel, formed by a collar and collection chamber as shown in FIG. 4, and into the mixing chamber 14. If water pumped from the funnel appears to have dye contained therein then the indication is that surface water has been flowing into the sediment. If dye is absent from the water taken from the funnel, then the indication is that groundwater has been flowing out of the sediment. In other embodiments, other types of sensors, including mechanical flow sensors may be employed to determine the direction of groundwater flow.

FIG. 4 illustrates one embodiment of the seepage meter of FIG. 1B and a seepage housing 30 that sits over a portion of the sea floor and that captures the flow of groundwater and channels it through a port that connects to the mixing chamber 14. As shown in FIG. 4, the seepage meter 10 and the housing 30 sit on the ocean floor and measure the flow of groundwater passing through the sediment that sits under the seepage housing 30. In this embodiment the housing 30 includes a lower collar that sits against the ocean floor and seals a collection chamber inside the housing 30 against the ocean floor. In one embodiment, the housing 30 is a metal can that is open at the bottom. The side wall of the housing forms a collar that penetrates into the ocean floor a sufficient distance to form a seal around a section of the ocean floor. This seal keeps ocean water from leaking into the interior of the housing 30 from the sides. The side wall also forms a collection chamber that holds fluid that may passing into the mixing chamber 14. In the depicted embodiment the housing penetrates about two or three inches (about 4 or 5 centimeters) into the ocean floor and the weight of the metal housing 30 is sufficiently large to keep the side wall of the housing 30 sealed against the ocean floor. Optionally, the housing could be sealed against the floor through other means, such as by using stakes that fix the housing 30 in place and sealed against the ocean floor. However, those of skill in the art will know other techniques for sealing the collar of the housing 30 against the ocean floor and any suitable technique may be employed.

In the embodiment depicted in FIG. 4, the collection chamber of the housing 30 is fluidly coupled to the mixing chamber 14 so that fluid passing through the section of ground surrounded by the collar and under the housing 30 passes through the depicted port and into the mixing chamber 14. In alternative embodiments the mixing chamber may be at least partially open at the bottom and the mixing chamber 14 itself may seal against the ocean floor.

Figure 5:
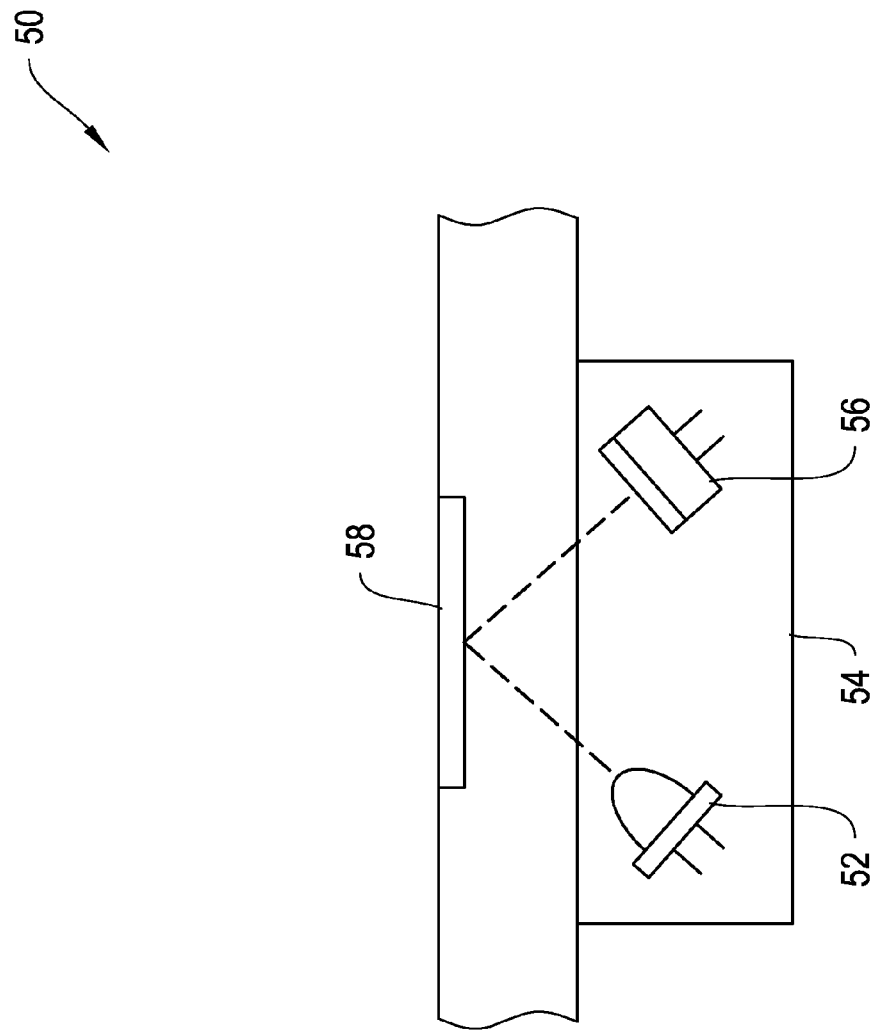
FIG. 5 depicts a light source and a light receiver passing a beam of light through fluid in the mixing chamber.

FIG. 5 depicts an alternate embodiment of a sensor probe (50). In the depicted embodiment an LED (52) is mounted to a circuit board (54) and a photodiode receiver (56) is mounted to the same board and is spaced away from the LED. A fluid carrying channel (58) is placed between the LED (52) and the photodiode (56). A sensor is sealed in a water tight package and may be placed into the mixing chamber 14. As described above with reference to FIG. 3, light from the LED passes through fluid in the channel. The photodiode measures the intensity of light passing through the fluid and this provides a measure of the absorbance characteristic of the fluid in the channel. Multiple ones of such sensors may be placed in the mixing chamber at different respective locations.

The systems and methods described herein provide many advantages and benefits over the state of the art. These include, but are not limited to providing systems that are less expensive than current configuration and may be made for about perhaps $6,000-$8,000, as compared to the $25,000 cost of certain state of the art systems. These systems can have decreased power usage, allowing for longer deployment of device than currently possible. The systems are less complex having fewer moving parts, resulting in improved reliability. These systems also may achieve better time resolution, and data points possible on time scales of seconds versus minutes. This can provide and the systems can achieve enhanced accuracy and provide the ability to detect and quantify contaminants contained within the flow of groundwater.

Those skilled in the art will know or be able to ascertain using no more than routine experimentation, many equivalents to the embodiments and practices described herein. For example, the systems and methods described above have been shown as stand alone devices placed on the ocean floor. However, in other embodiments and configurations, the systems describe herein may be integrated into other devices and equipment on the ocean floor, including ocean floor observatories, sea floor mooring anchors and other devices. Further, it will be understood that the systems and methods described herein can be expanded to measure the flow of groundwater, as well as the flow of chemicals or other elements being carried in the groundwater, and further to measure other characteristics of a groundwater flow, such as the temperature or salinity of water seeping into the ocean. Additionally, the systems and methods described herein are largely discussed with reference to measuring seepage rates of groundwater into an ocean environment. However, the systems and methods described herein are not so limited in their applications and may be used to measure any type of fluid flow and the size and configuration of the devices may vary according to the application. Additionally, the systems and methods herein may be used to measure fluid flow into lakes, streams and reservoirs as well as to measure fluid flow at underground/subsurface locations.

Accordingly, it will be understood that the invention is not to be limited to the embodiments disclosed herein, but is to be understood from the following claims, which are to be interpreted as broadly as allowed under the law.

The invention claimed is:

1. A seepage meter for measuring a flow of ground water, comprising
    a collar for fastening to a section of ground and forming a fluid tight seal around the section of ground,
    a mixing chamber coupled to the collar and having
        an inlet and an outlet for allowing fluid to pass from the collar through the mixing chamber,
        a dye injector for making timed injections of a water soluble dye into the mixing chamber, and
        a pump for distributing the dye equally about the mixing chamber, and
        an optical absorbance meter located within the mixing chamber and having a light source for passing a beam of light through the fluid flowing through the mixing chamber and a light receiver for measuring a characteristic representative of absorbance of a wavelength of light, and a processor for processing the measured characteristic to determine a rate of flow for fluid passing through the section of ground.

2. A seepage meter according to claim 1, further comprising
a collection chamber coupled to the collar for collecting fluid passing through the section of ground.

3. A seepage meter according to claim 1, further comprising
a pump for mixing the dye and fluid in the mixing chamber.

4. A seepage meter according to claim 1, wherein the absorbance meter includes
a plurality of light sources disposed at different respective locations within the mixing chamber.

5. A seepage meter according to claim 1, further including
a timer for making a series of timed measurements and dye injections for determining a rate of flow of groundwater through the section of ground.

6. A seepage meter according to claim 1, further including
a background sensor for measuring a characteristic representative of absorbance of a wavelength of light of fluid in the mixing chamber and absent the injected dye.

7. A seepage meter according to claim 1, further comprising
a sensor to measure direction of groundwater flow.

8. A seepage meter according to claim 1, further comprising
a water tight housing around device.

9. A seepage meter according to claim 1, wherein
The absorbance meter measures absorbance of at least two wavelengths of light and preferably one of the wavelengths is in the about 590 nm.

10. A seepage meter according to claim 1, further comprising
a chemical sensor for detecting a chemical element flowing through the mixing chamber and for determining rate of flow of the chemical through the section of ground.

11. A process for measuring a flow of ground water, comprising
fastening a collar to a section of ground and forming a fluid tight seal around the section of ground, and coupling a mixing chamber to the collar such that ground water passing through the section of ground will pass through the mixing chamber,
injecting a dye into fluid within the mixing chamber,
passing a beam of light through the fluid flowing through the mixing chamber and measuring light passed through the fluid to record a characteristic representative of absorbance of a wavelength of light, and
processing the measured characteristic to determine a rate of flow for fluid passing through the section of ground.

12. A process according to claim 11, further comprising the step of
mixing the dye and fluid in the mixing chamber.

13. A process according to claim 11, further comprising
providing a plurality of light sources at different respective locations within the mixing chamber for taking plural measures of absorbance.

14. A process according to claim 11, further comprising the step of
making a series of timed measurements and dye injections for determining a rate of flow of groundwater through the section of ground.

15. A process according to claim 11, further comprising the step of
measuring a characteristic representative of absorbance of a wavelength of light of fluid in the mixing chamber and absent the injected dye.

16. A process according to claim 11, further comprising the step of
measuring direction of groundwater flow.

17. A process according to claim 11, further comprising the step of
measuring absorbance of at least two wavelengths of light and preferably one of the wavelengths is in the about 590 nm.

* * * * *

UNITED STATES PATENT AND TRADEMARK OFFICE
CERTIFICATE OF CORRECTION

| | | |
|---|---|---|
| PATENT NO. | : 7,637,168 B2 | Page 1 of 1 |
| APPLICATION NO. | : 11/900505 | |
| DATED | : December 29, 2009 | |
| INVENTOR(S) | : Matthew Charette | |

It is certified that error appears in the above-identified patent and that said Letters Patent is hereby corrected as shown below:

In the specification

In Column 1, line 7, before "BACKGROUND" the following should be inserted:

--STATEMENT OF RIGHTS TO INVENTIONS MADE UNDER FEDERALLY SPONSORED RESEARCH
This invention was made with Government support under Grant No. NA07OR0351 awarded by the National Oceanic and Atmospheric Administration. The Government has certain rights in this invention.--

Signed and Sealed this
Seventh Day of June, 2016

Michelle K. Lee
*Director of the United States Patent and Trademark Office*